United States Patent
Bernklau et al.

(10) Patent No.: US 10,130,038 B2
(45) Date of Patent: Nov. 20, 2018

(54) CORN HEAD ROW UNIT GEARBOX DRIVE SHAFT SEAL

(71) Applicant: Deere & Company, Moline, IL (US)

(72) Inventors: Nathaniel R. Bernklau, Davenport, IA (US); Randy R. Welch, Hudson, IA (US); Duane M. Bomleny, Geneseo, IL (US); Sara Cabezas, Madrid (ES); Javier Jose Perez Ramirez, Bettendorf, IA (US); Badhe Prafulla Sudhakar, Jalgaon (IN)

(73) Assignee: Deere & Company, Moline, IL (US)

( * ) Notice: Subject to any disclaimer, the term of this patent is extended or adjusted under 35 U.S.C. 154(b) by 118 days.

(21) Appl. No.: 14/874,227

(22) Filed: Oct. 2, 2015

(65) Prior Publication Data

US 2017/0094907 A1    Apr. 6, 2017

(51) Int. Cl.
| | |
|---|---|
| *F16J 15/00* | (2006.01) |
| *A01D 69/06* | (2006.01) |
| *A01D 45/02* | (2006.01) |
| *A01D 57/06* | (2006.01) |
| *F16J 15/3232* | (2016.01) |
| *F16J 15/3264* | (2016.01) |
| *A01D 101/00* | (2006.01) |

(52) U.S. Cl.
CPC .......... *A01D 69/06* (2013.01); *A01D 45/023* (2013.01); *A01D 57/06* (2013.01); *F16J 15/3232* (2013.01); *F16J 15/3264* (2013.01); *A01D 2101/00* (2013.01)

(58) Field of Classification Search
CPC .. F16J 15/3232; F16J 15/3204; F16J 15/3236; A01D 69/06; A01D 57/06; A01D 45/021; A01D 2101/00

USPC .................. 277/309, 349–353, 394
See application file for complete search history.

(56) References Cited

U.S. PATENT DOCUMENTS

| | | |
|---|---|---|
| 2,633,208 A | 3/1953 | Randt |
| 3,075,690 A | 1/1963 | Luenberger |
| 3,271,940 A | 9/1966 | Ashton et al. |

(Continued)

FOREIGN PATENT DOCUMENTS

| | | |
|---|---|---|
| CN | 104165219 A | 11/2014 |
| CN | 102003531 B | 8/2015 |

(Continued)

OTHER PUBLICATIONS

Extended EP Search Report Application No. 16184446.9, dated Jul. 31, 2017, 7 pages.

(Continued)

*Primary Examiner* — Nathan Cumar
(74) *Attorney, Agent, or Firm* — Joseph R. Kelly; Kelly, Holt & Christenson, PLLC

(57) ABSTRACT

A corn head row unit gearbox includes an input shaft, that rotates about a first axis of rotation and that drives a set of gears. The gears transfer rotation of the input shaft into rotation of a gathering chain output shaft about a second axis of rotation, generally transverse to the first axis of rotation. The gathering chain drive shaft rotates within a bushing mounted within a frame structure of the gearbox. A bushing seal has an annular mounting sleeve with an inner diameter that is press fit over a boss on the frame structure.

16 Claims, 4 Drawing Sheets

(56) References Cited

U.S. PATENT DOCUMENTS

| | | | | |
|---|---|---|---|---|
| 3,291,495 | A | * | 12/1966 | Liebig ................. F16J 15/3224 277/577 |
| 3,341,265 | A | * | 9/1967 | Paterson ................. B61F 15/22 277/356 |
| 3,461,656 | A | * | 8/1969 | Van Ausdall .......... A01D 34/43 56/17.1 |
| 3,589,110 | A | | 6/1971 | Schreiner |
| 3,605,946 | A | | 9/1971 | Oehl |
| 3,759,021 | A | | 9/1973 | Schreiner et al. |
| 3,831,356 | A | | 8/1974 | Maiste et al. |
| 3,858,384 | A | | 1/1975 | Maiste et al. |
| 3,913,924 | A | * | 10/1975 | Barefoot .............. F16J 15/3276 277/568 |
| 4,252,329 | A | * | 2/1981 | Messenger ........... F16J 15/3264 277/551 |
| 4,434,606 | A | * | 3/1984 | Rhodes ................. A01D 45/02 56/106 |
| 4,791,778 | A | | 10/1988 | Wilson |
| 5,232,291 | A | | 8/1993 | Kuan |
| 5,890,812 | A | * | 4/1999 | Marcello ............ F16C 33/7813 384/148 |
| 6,098,740 | A | | 8/2000 | Abend et al. |
| 6,485,185 | B1 | * | 11/2002 | Conway, Jr. ......... F16C 19/364 384/480 |
| 7,874,134 | B1 | | 1/2011 | Hoffman |
| 8,356,695 | B2 | | 1/2013 | Scuffham et al. |
| 9,386,747 | B2 | | 7/2016 | Madheswaran et al. |
| 2007/0193408 | A1 | | 8/2007 | Martinez |
| 2008/0169611 | A1 | * | 7/2008 | Greca ................. F16J 15/3264 277/407 |
| 2009/0191992 | A1 | | 7/2009 | Osborne |
| 2015/0319927 | A1 | | 11/2015 | Madheswaran |
| 2017/0094907 | A1 | | 4/2017 | Bernklau |

FOREIGN PATENT DOCUMENTS

| | | |
|---|---|---|
| DE | 19930804 A1 | 1/2001 |
| EP | 0908650 A1 | 4/1999 |
| EP | 1266148 B1 | 2/2006 |
| EP | 2570017 A1 | 3/2013 |
| JP | 2010133504 A | 6/2010 |
| WO | 0113014 A1 | 2/2001 |
| WO | 2011114769 A1 | 9/2011 |

OTHER PUBLICATIONS

U.S. Appl. No. 14/874,212 Office Action dated May 22, 2017, 13 pages.
U.S. Appl. No. 14/874,212 Notice of Allowance dated Sep. 13, 2017 5 pages.
Extended EP Search Report Application No. 16184444.4, dated Jan. 31, 2007, 7 pages.

* cited by examiner

CORN HEAD ROW UNIT GEARBOX DRIVE SHAFT SEAL

FILED OF THE DESCRIPTION

The present description relates to a row-crop harvester. More specifically, the present description relates to a row unit gearbox for a corn head that can be used on a row-crop harvester.

BACKGROUND

There are a variety of different types of harvesting machines that can be used to harvest row crops, such as corn. Such machines often have a header (or head) that is used to engage the crop to be harvested.

A corn head, for instance, may have a plurality of different row units that are arranged next to one another, and that are spaced apart from one another by a distance that roughly corresponds to a row spacing between adjacent rows of the corn to be harvested. The row units can include crop dividers that separate the stalks of adjacent rows from one another, as the harvester moves in a forward direction of travel. The row units are often provided with gathering chains that have lugs projecting out from the gathering chains. Two adjacent gathering chains rotate in cooperation with one another in order to engage the stalks of the plant being harvested and move them toward the harvester. The gathering chains are normally driven by a set of gathering chain drive shafts.

The row units also often have forwardly extending snapping rollers that are mounted to a pair of snapping roller drive shafts. The snapping rollers are configured to draw the corn stalks downward, causing the ears of corn, which are too large to pass between the two snapping rollers, to become detached from the stalks and to move into the harvester.

Power is provided to both the gathering chain drive shafts and the snapping roller drive shafts (i.e., the output shafts) through a row unit gearbox. An input drive shaft drives a set of spur gears that interact with corresponding bevel gears on the gathering chain drive shafts, and the snapping roller drive shafts, to drive both sets of output shafts. The gearbox includes a fluid lubricant that is used to lubricate the various gears and bushings in the gearbox.

The discussion above is merely provided for general background information and is not intended to be used as an aid in determining the scope of the claimed subject matter.

SUMMARY

A corn head row unit gearbox includes an input shaft, that rotates about a first axis of rotation and that drives a set of gears. The gears transfer rotation of the input shaft into rotation of an output shaft about a second axis of rotation, generally transverse to the first axis of rotation. The output shaft rotates within a bushing mounted within a frame structure of the gearbox. A seal has an annular mounting sleeve with an inner diameter that is press fit over a boss on the frame structure.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
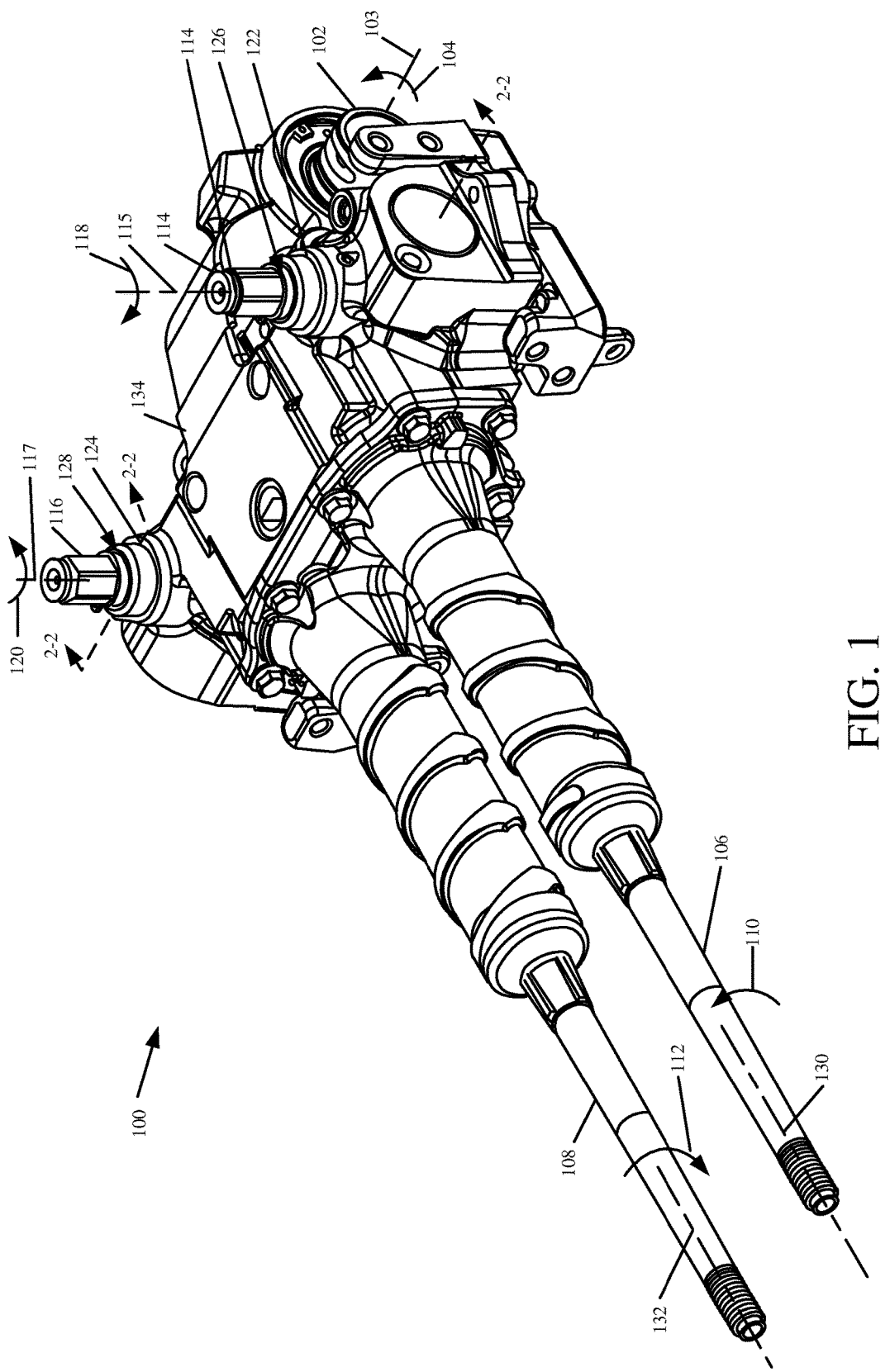
FIG. 1 is an isometric view of one example of a corn head row unit gearbox.

FIG. 1 is an isometric view of one example of a corn head row unit gearbox 100. Gearbox 100 illustratively includes an input shaft shown generally at 102. Input shaft 102 illustratively rotates about an axis of rotation 103 in the direction indicated by arrow 104. It drives a series of gears (such as spur gears, or bevel gears) which drive rotation of two sets of output shafts. The first set of output shafts includes drive shafts 106 and 108 that drive rotation of stalk snapping rollers. Shafts 106 and 108 illustratively rotate about axes of rotation 130 and 132, in the directions indicated by arrows 110 and 112, respectively, when drive shaft 102 rotates in the direction indicated by arrow 104. The second set of output shafts that are driven by the input shaft 102 includes gathering chain drive shafts 114 and 116. They illustratively rotate about axes of rotation 115 and 117, in the directions indicated by arrows 118 and 120, respectively, to drive a set of gathering chains on the row unit.

Drive shafts 114 and 116 are mounted to gearbox 100 for rotation within a set of bushings shown generally at 122 and 124. The bushings can define an inner surface that is generally coaxial with drive shafts 114 and 116. Bushings 122 and 124 can be sealed with seals 126 and 128. Seals 126 and 128 generally inhibit the migration of lubricant out of bushings 122 and 124, respectively, and also illustratively inhibit the introduction of foreign matter (such as water, crop debris, dirt, etc.) into the bushings.

FIG. 1 also shows that gearbox 100 includes a structural housing portion shown generally at 134. Structural housing portion 134 illustratively defines a gear train containment area that contains the gears that are used to transmit rotation from the input shaft 102 to the two sets of output shafts 106-108 and 114-116. The gear train containment area is often provided with lubricant.

In some examples, the row units that carry gearbox 100 have a compact design. This is so that the row units can be placed closer to one another, to accommodate more narrow spacing of the planted row crop. Thus, maintaining a compact design in gearbox 100 can help to accommodate this as well.

In one example, during operation, the orientation of the header can be moved so that the orientation of gearbox 100 varies. By way of example, during a harvesting operation, it may be that the orientation of the header is such that the longitudinal axes 130 and 132, of the stalk snapping roller drive shafts 106 and 108 are parallel, or nearly parallel, to the ground. However, when being stored, the corn head may be oriented such that the longitudinal axes 130 and 132 are oriented more vertically, such that the ends of shafts 106 and 108 furthest from the corn head are pointed more downwardly. This is sometimes referred to as the storage position of the corn head.

Gathering train drive shafts 114 and 116 are generally oriented vertically, during operation. Therefore, bushings 122 and 124 are also generally oriented vertically, as they are generally coaxial with shafts 114 and 116. Thus, the combined effects of the environment in which gearbox 100 operates, and the shaft orientation can tend to introduce foreign matter into the bushings.

Some seal designs have used grease to both lubricate and seal the bushings. However, this can lead to reduced mechanical efficiency and serviceability. Therefore, some current gearboxes use oil lubrication. While this type of lubrication can improve serviceability and mechanical efficiency, it does not act as efficiently as a seal against either the migration of lubricant out of the bushing or the introduction of foreign matter into the bushing. Thus, some radial oil lip seals have been used. However, these types of seals often use large machined recessed bores to facilitate mounting using an outer diameter press fit. If the recessed bore were reduced in size (to maintain a compact design), this often leads to a reduction in the size of the gathering chain drive shaft. This reduces the load capacity that can be driven by the drive shaft. Also, because of the harsh environment of the gearbox, and because crop debris and water ingress is prevalent in corn head applications, some current seals, even when outfitted with multiple dirt lips or excluder lips, do not provide adequate protection in the environment of the corn head gathering chain drive shaft.

Figure 2:
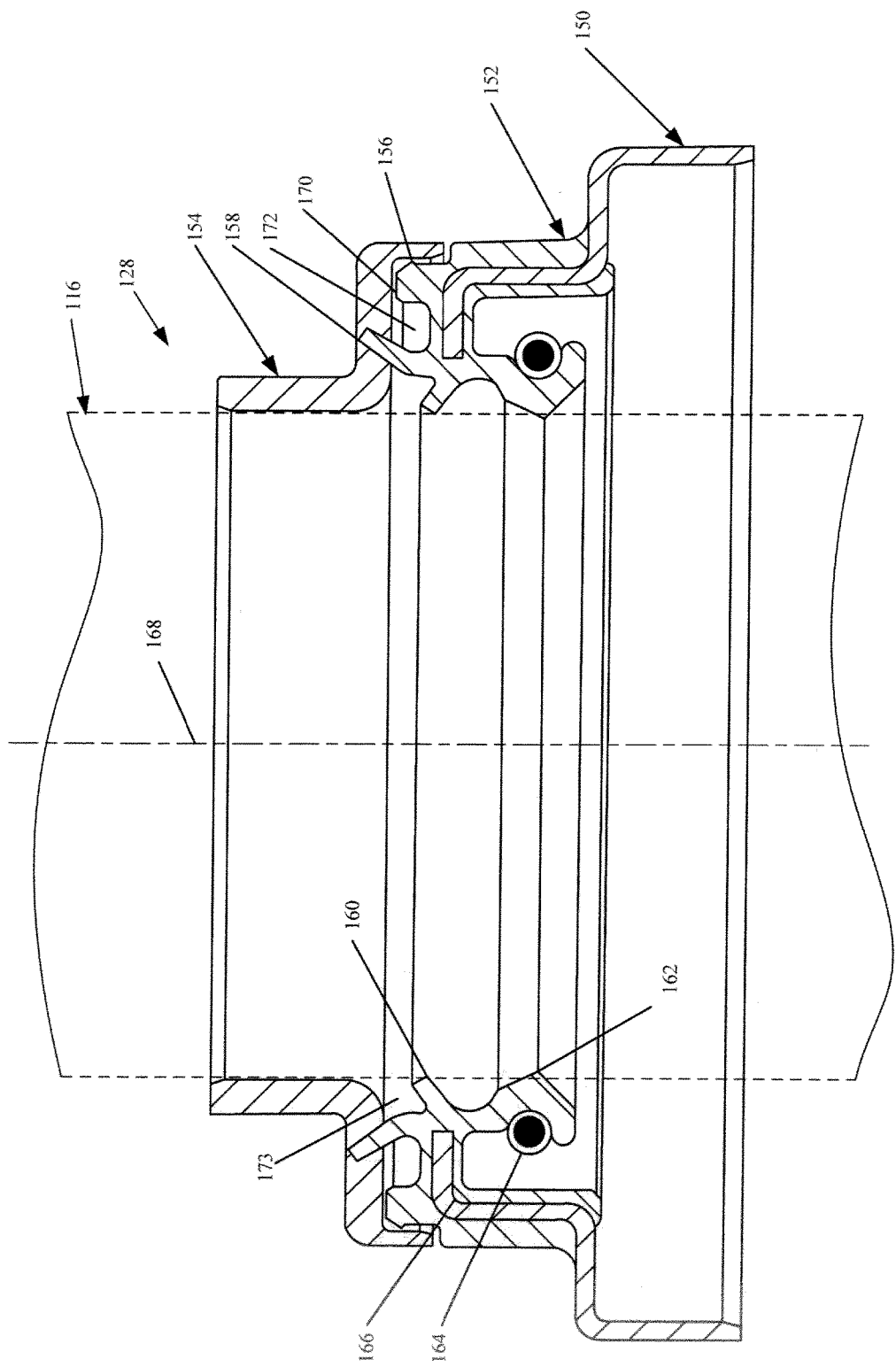
FIG. 2 is a cross sectional view of a gearbox seal shown in FIG. 1.

FIG. 2 illustrates a cross sectional view of one example of a seal that can be used to seal the bushing of the gathering chain drive shafts 114 and 116 (or other bushings in gearbox 100). In the example illustrated in FIG. 2, the seal is depicted as seal 128. It will be noted, however, that it could just as easily be seal 126 or another seal on gearbox 100.

In the example shown in FIG. 2, seal 128 illustratively includes a generally annular attachment sleeve 150 that is attached to a resilient labyrinth seal member 152. Labyrinth seal member 152 is illustratively covered by a generally annular wear sleeve 154. Wear sleeve 154 is attached to drive shaft 116 so that it rotates relative to labyrinth seal member 152 and annular attachment sleeve 150. Labyrinth seal member 152 illustratively includes a first annular lip 156, an annular excluder lip 158, an annular dirt lip 160 and an annular oil lip 162. Lip 162 can be biased inwardly by a bias member 164 which can be, for instance, a garter spring or another type of bias member. It will be noted that the different portions of seal 128 can be formed of a wide variety of different materials. In one example, annular attachment member 150 and wear sleeve 154 are formed of stainless steel, while labyrinth seal member 152 is formed of a material that is resilient relative to annular attachment sleeve 150. For instance, it can be formed of rubber that is molded onto an extending attachment portion 166 of annular attachment sleeve 150. Attachment sleeve 150, resilient labyrinth seal member 152 and wear sleeve 154 are all generally coaxial about a longitudinal axis 168.

Also, in one example, the excluder lip 158 is normally biased to a more vertical orientation than that shown in FIG. 2. However, when wear sleeve 154 is assembled onto the shaft member 116 it deflects excluder lip 158 in the downward direction, away from axis 168, as shown in FIG. 2. The resilience of excluder lip 158 biases it upward for frictional engagement with wear sleeve 154, as shown.

Also, in the example shown in FIG. 2, labyrinth seal member 152 can include annular ridge 170. Ridge 170 and excluder lip 158 cooperate with wear sleeve 154 to define an annular void 172. Void 172 can be packed with grease, and provides a space for excluder lip 158 to deflect outwardly under the influence of wear sleeve 154 as shown in FIG. 2 and described above. Also, in one example, the surfaces of seal 128 may all be greased or otherwise lubricated.

Figure 3:
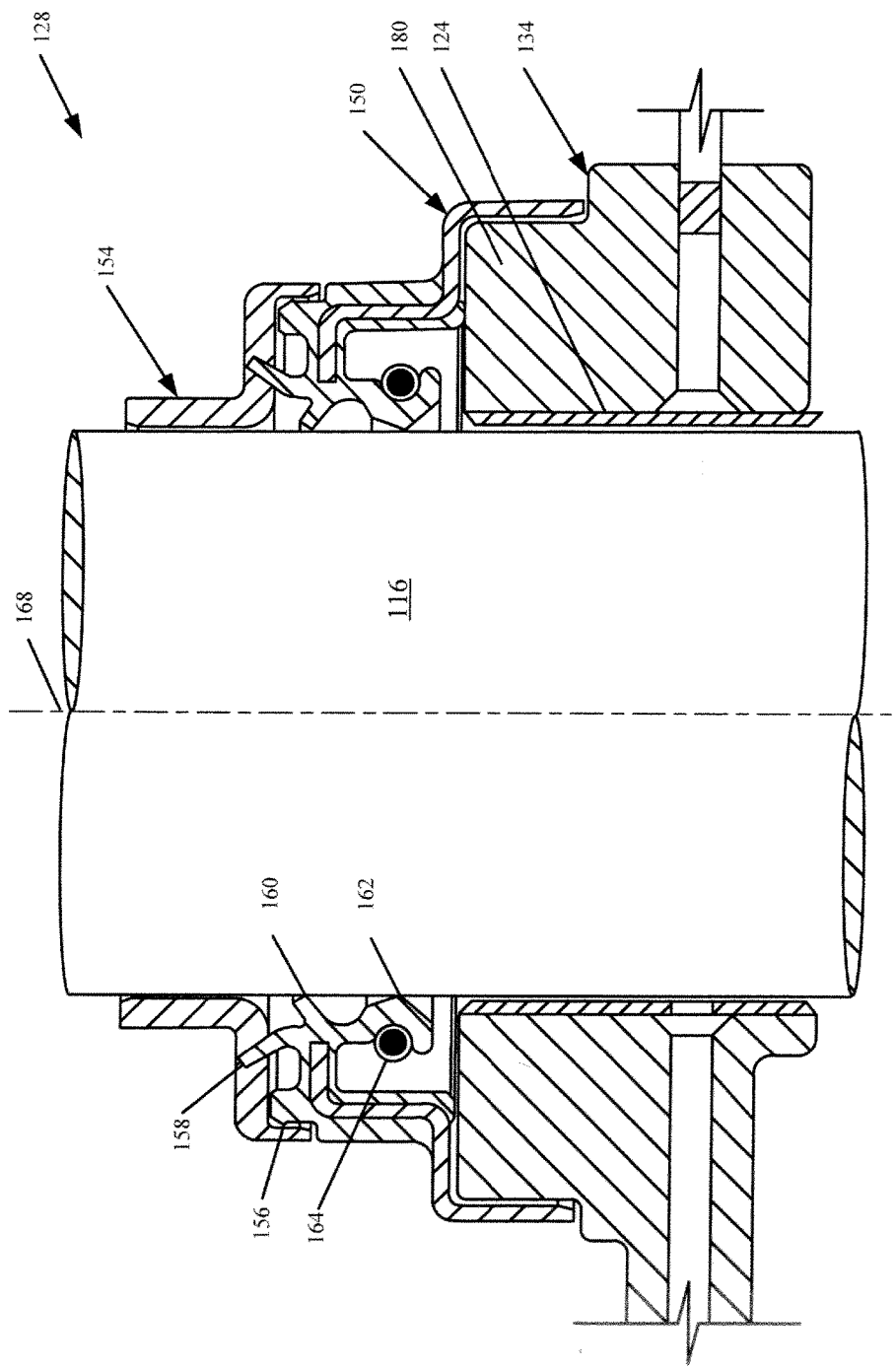
FIG. 3 is an enlarged cross sectional view of the seal mounted on a frame structure of the gear box.

FIG. 3 is a cross sectional view of seal 128 disposed on structural housing 134, and rotationally supporting gathering chain drive shaft 116, therein. The items shown in FIG. 3 are similarly numbered to those shown in FIGS. 1 and 2. FIG. 3 shows that, in one example, structural housing 134 illustratively has a boss 180. Boss 180 is generally annular in shape, and has an outer diameter that is sized so that the inner diameter of attachment sleeve 150 can be press fit over the outer diameter of boss 180. Boss 180 may be machined or formed in other ways. FIG. 3 also shows that the inner diameter of boss 180 is sized to receive bushing 124 for rotational support of drive shaft 116.

Figure 4:
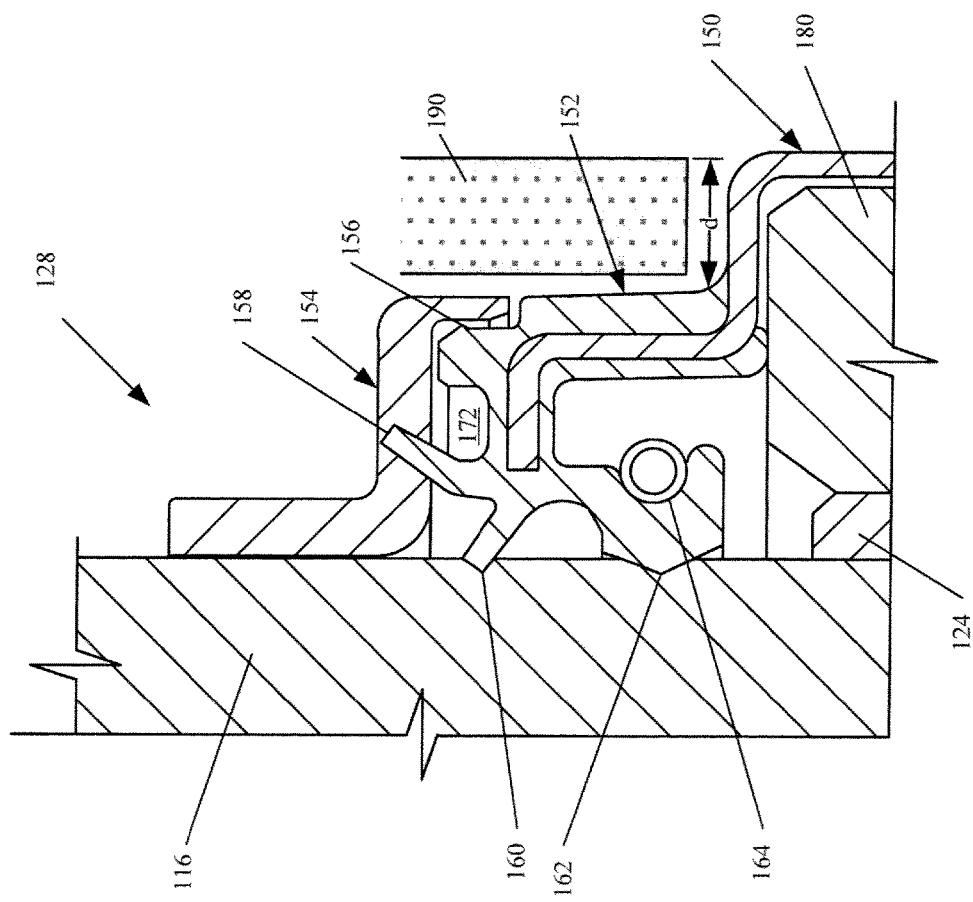
FIG. 4 is an enlarged schematic view of a portion of the gearbox seal.

FIG. 4 is an enlarged schematic view of a portion of seal 128. Again, similar things are numbered similarly to previous Figures. FIG. 4 shows that dirt lip 160 and oil lip 162 are illustratively sized to frictionally engage the outer surface of shaft 116. Oil lip 162 also illustratively acts to hold lubricant in a region proximate the interface between bushing 124 and shaft 116. Excluder lip 158 also frictionally engages wear sleeve 154, as does lip 156.

Therefore, for dirt, water, other debris or other foreign matter to cross seal 128, it must traverse the fairly extensive labyrinth formed by seal member 152, and wear sleeve 154. For instance, in the example shown in FIG. 4, for foreign matter to reach the interface between bushing 124 and drive shaft 116, it must move radially inward between sprocket skirt 190 and member 150 and then it must move upwardly between labyrinth seal member 152 and the overlapping portion of wear sleeve 154, that is frictionally engaged by lip 156. It must then move radially inward and cross void 172, which may be filled with grease or other sealing material. It must then move further radially inward and cross the frictional interface between excluder lip 158 and the inner surface of wear sleeve 154. The material must then pass downwardly and cross the void 173, which may be filled with grease. The material must then pass downwardly and cross the frictional interface between dirt lip 160 and the outer surface of drive shaft 116, and then move further downwardly to cross the frictional interface between oil lip 162 and drive shaft 116 (overcoming the bias exerted by bias member 164).

It will be noted that seal 128 thus provides enhanced sealing operation. First, because the inner diameter of attachment sleeve 150 is press fit over boss 180, it need not have an outer diameter that is press fit within a machined recess in structural frame 134. This eliminates the need for relatively large machined, recessed bores for the outer diameter press fit mounting inside the gearbox casting. This provides for a more compact design and allows for a larger diameter gathering chain drive shaft 116. Also, because of the inner diameter press fit arrangement of seal 128, the size of drive shaft 116 can be increased without increasing the overall outer dimension of seal 128. Instead, the inner diameter of boss 180 can be enlarged, while maintaining its outer diameter constant. Thus, the size of drive shaft 116 can be increased (and thus its load capacity can be increased) without increasing the overall size of seal 128. This allows the row units on a corn head to maintain relatively narrow spacing, while still increasing the load capacity of the gathering train drive shafts.

In addition, seal 128 has a variety of features that protect the interface between bushing 124 and drive shaft 116 from harsh crop debris and water or other foreign matter ingress. It not only includes oil lip 162 and dirt lip 160, but it also includes a relatively large, generally vertically oriented axial excluder lip 158. Lip 158 acts in combination with the inner surface of the overlapping wear sleeve 154 to form an additional sealing mechanism. In addition, the overlapping wear sleeve 154 is configured to overlap the labyrinth seal member 152, and frictionally engaged annular lip 156. Thus, the combination of overlapping wear sleeve 154 and labyrinth seal member 152 provides a close running labyrinth to inhibit the ingress of contaminating matter. In one example, as mentioned above, the wear sleeve 154 and annular attachment sleeve 150 are formed of a corrosion resistant material, such as stainless steel. Labyrinth seal member 152 can be formed of a resilient member, such as rubber. It will be noted, however, that these are examples only.

FIG. 4 also shows that, because the outer diameter of seal 128 can be maintained, a distance and between the outer periphery of labyrinth seal member 152, and the outer periphery of annular attachment sleeve 150 is relatively large. This distance provides an annular space between a gathering chain sprocket skirt 190 and the outer periphery of the seal 128. This space (which in some previous seals, was occupied by the seal, itself) can now be used for other purposes, such as to increase the size of drive shaft 116 and bushing 124, or for other reasons.

It should also be noted that the different examples described herein can be combined in different ways. That is, parts of one or more examples can be combined with parts of one or more other examples. All of this is contemplated herein.

Example 1 is a row unit gear box seal system, comprising:
an annular mounting collar, that has an annular mounting sleeve annularly disposed about an axis and having an inner surface, the inner surface of the annular mounting sleeve having an inner diameter sized for press fit engagement with an outer surface of a boss on a structural frame of a row unit gear box, the annular mounting collar having a connection member extending away from the annular mounting sleeve in an axial direction;
a resilient seal member, that is resilient relative to the connection member of the annular mounting collar, fixedly coupled to the connection member and oriented for frictional engagement with a drive shaft that rotates relative to the structural frame; and
a wear sleeve that has an overlapping portion that overlaps at least a portion of the resilient seal member in the axial direction, the wear sleeve frictionally engaging the resilient seal member, and being rotatably mounted relative to the resilient seal member, to rotate with the drive shaft.

Example 2 is the row unit gear box seal system of any or all previous examples wherein the resilient seal member comprises:
a first annular lip extending radially inward toward the axis and sized for frictional engagement with the drive shaft.

Example 3 is the row unit gear box seal system of any or all previous examples wherein the drive shaft rotates within a bushing mounted to the structural frame of the row unit gear box and wherein the resilient seal member comprises:
a second annular lip axially spaced from the first annular lip in a direction away from the bushing, the second annular lip extending radially inward toward the axis and being sized for frictional engagement with the drive shaft.

Example 4 is the row unit gear box seal system of any or all previous examples wherein the resilient seal member comprises:
a generally axially extending lip that frictionally engages a first portion of the wear sleeve, the first portion of the wear sleeve being different from the overlapping portion of the wear sleeve.

Example 5 is the row unit gear box seal system of any or all previous examples wherein the first portion of the wear sleeve deflects the axially extending lip in a direction generally radially away from the axis.

Example 6 is the row unit gear box seal system of any or all previous examples wherein the resilient seal member comprises:
a third annular lip extending radially outward away from the axis and frictionally engaging the overlapping portion of the wear sleeve.

Example 7 is the row unit gear box seal system of any or all previous examples and further comprising:
a bias member disposed about the first annular lip and biasing the first annular lip of the resilient seal member radially inwardly.

Example 8 is the row unit gear box seal system of any or all previous examples wherein the resilient seal member is molded onto the connection member of the annular mounting collar.

Example 9 is the row unit gear box seal system of any or all previous examples wherein the annular mounting collar are made of stainless steel and wherein the resilient seal member is made of rubber.

Example 10 is a corn head row unit gear box, comprising:
a structural frame having a first annular boss;
an input shaft rotatably mounted to the structural frame;
a set of output shafts rotatably mounted to the structural frame by a set of mounting mechanisms;
a gear train mounted within the structural frame that transfers rotation of the input shaft into rotation of the set of output shafts; and
a first seal system disposed about at least a given one of the mounting mechanisms that mounts at least a given one of the output shafts to the structural frame within the first annular boss, the first seal system comprising:
a first annular mounting collar, that has an annular mounting sleeve with an inner surface in press fit engagement with an outer surface of the first annular boss, the first annular mounting collar having a connection member extending away from the annular mounting sleeve in an axial direction;
a first resilient seal member, that is resilient relative to the connection member of the first annular mounting collar, fixedly coupled to the connection member and frictionally engaging the given output shaft; and
a first wear sleeve that has an overlapping portion that overlaps at least a portion of the first resilient seal member in the axial direction, the first wear sleeve frictionally engaging the first resilient seal member, and being rotatably mounted relative to the first resilient seal member, to rotate with the given output shaft.

Example 11 is the corn head row unit gear box of any or all previous examples wherein the set of output shafts comprises a first gathering chain drive shaft and a second gathering chain drive shaft and wherein the given output shaft comprises the first gathering chain drive shaft.

Example 12 is the corn head row unit gear box of any or all previous examples wherein the structural frame includes a second annular boss and further comprising:
  a second seal system disposed about at least a given one of the mounting mechanisms that mounts the second gathering chain drive shaft to the structural frame within the second annular boss.

Example 13 is the corn head row unit gear box of any or all previous examples wherein the second seal system comprises:
  a second annular mounting collar, that has an annular mounting sleeve with an inner surface in press fit engagement with an outer surface of the second annular boss, the second annular mounting collar having a connection member extending away from the annular mounting sleeve in an axial direction;
  a second resilient seal member, that is resilient relative to the connection member of the second annular mounting collar, fixedly coupled to the connection member and frictionally engaging the second gathering chain drive shaft; and
  a second wear sleeve that has an overlapping portion that overlaps at least a portion of the second resilient seal member in the axial direction, the second wear sleeve frictionally engaging the second resilient seal member, and being rotatably mounted relative to the second resilient seal member, to rotate with the second gathering chain drive shaft.

Example 14 is the corn head row unit gear box of any or all previous examples wherein the first gathering chain drive shaft rotates within a first bushing mounted to the structural frame and wherein the first resilient seal member comprises:
  a first annular lip extending radially inward toward the axis and frictionally engaging the first gathering chain drive shaft;
  a second annular lip axially spaced from the first annular lip in a direction away from the first bushing, the second annular lip extending radially inward toward the axis and frictionally engaging the first gathering chain drive shaft; and
  a generally axially extending lip that frictionally engages a first portion of the first wear sleeve, the first portion of the first wear sleeve being different from the overlapping portion of the first wear sleeve, the first portion of the first wear sleeve deflecting the axially extending lip in a direction generally radially away from the axis.

Example 15 is the corn head row unit gear box of any or all previous examples wherein the first resilient seal member comprises:
  a third annular lip extending radially outward away from the axis and frictionally engaging the overlapping portion of the first wear sleeve.

Example 16 is the corn head row unit gear box of any or all previous examples wherein the second gathering chain drive shaft rotates within a second bushing mounted to the structural frame and wherein the second resilient seal member comprises:
  a first annular lip extending radially inward toward the axis and frictionally engaging the second gathering chain drive shaft;
  a second annular lip axially spaced from the first annular lip in a direction away from the second bushing, the second annular lip extending radially inward toward the axis and frictionally engaging the second gathering chain drive shaft; and
  a generally axially extending lip that frictionally engages a first portion of the second wear sleeve, the first portion of the second wear sleeve being different from the overlapping portion of the second wear sleeve, the first portion of the second wear sleeve deflecting the axially extending lip in a direction generally radially away from the axis.

Example 17 is the corn head row unit gear box of any or all previous examples wherein the second resilient seal member comprises:
  a third annular lip extending radially outward away from the axis and frictionally engaging the overlapping portion of the second wear sleeve.

Example 18 is a row unit gear box seal system, comprising:
  an attachment member that attaches to a structural frame of a row unit gear box that includes a gathering chain drive shaft rotatably mounted to the structural frame by a bushing;
  a wear sleeve attached to the gathering chain drive shaft for rotation with the gathering chain drive shaft;
  a resilient seal member, that is resilient relative to the attachment member and that is fixedly coupled to the attachment member, the resilient member comprising:
    a first annular lip extending radially inward toward an axis of rotation of the gathering chain drive shaft, and sized for frictional engagement with the gathering chain drive shaft;
    a second annular lip axially spaced from the first annular lip in a direction away from the bushing, the second annular lip extending radially inward toward the axis of rotation and sized for frictional engagement with the gathering chain drive shaft; and
    a generally axially extending lip that frictionally engages a first portion of the wear sleeve, the first portion of the wear sleeve deflecting the axially extending lip in a direction generally radially away from the axis of rotation of the gathering chain drive shaft.

Example 19 is the row unit gear box seal system of any or all previous examples wherein the wear sleeve that has an overlapping portion, different from the first portion, that overlaps at least a portion of the resilient seal member in the axial direction the first portion of the wear sleeve being different from the overlapping portion of the wear sleeve, and wherein the resilient seal member comprises:
  a third annular lip extending radially outward away from the axis of rotation and frictionally engaging the overlapping portion of the wear sleeve.

Example 20 is the row unit gear box seal system of any or all previous examples wherein the attachment member comprises:
  an annular mounting collar, that has an annular mounting sleeve annularly disposed about the axis of rotation of the gathering chain drive shaft and having an inner surface, the inner surface of the annular mounting sleeve having an inner diameter sized for press fit engagement with an outer surface of a boss on the structural frame.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A row unit gear box seal system, comprising:
an annular attachment sleeve annularly disposed about an axis and having an inner surface, the inner surface of the annular attachment sleeve having an inner diameter sized for press fit engagement with an outer surface of a boss on a structural frame of a row unit gear box;
a resilient seal member, that is resilient relative to the annular attachment sleeve, fixedly coupled to a portion of the annular attachment sleeve and oriented for frictional engagement with a drive shaft that rotates relative to the structural frame, wherein the resilient seal member directly engages the drive shaft; and
a wear sleeve that has an overlapping portion that overlaps at least a portion of the resilient seal member in an axial direction, the wear sleeve frictionally engaging the resilient seal member, and being rotatably mounted relative to the resilient seal member, to rotate with the drive shaft and wherein the resilient seal member includes an elongate annular excluder lip that has a connection portion and a tip portion, the tip portion being disposed, in a relaxed position, radially spaced from the axis further than the connection portion, the tip portion frictionally engaging a first portion of the wear sleeve, the first portion of the wear sleeve being different from the overlapping portion of the wear sleeve, the first portion of the wear sleeve deflecting the tip portion of the annular excluder lip in a direction generally radially away from the axis, when the wear sleeve is fitted over the resilient seal member.

2. The row unit gear box seal system of claim 1 wherein the resilient seal member comprises:
an annular oil lip extending radially inward toward the axis and sized for frictional engagement with the drive shaft.

3. The row unit gear box seal system of claim 2 wherein the drive shaft rotates within a bushing mounted to the structural frame of the row unit gear box and wherein the resilient seal member comprises:
an annular dirt lip axially spaced from the annular oil lip in a direction away from the bushing, the annular dirt lip extending radially inward toward the axis and being sized for frictional engagement with the drive shaft.

4. The row unit gear box seal system of claim 3 wherein the resilient seal member comprises:
a first annular lip extending radially outward away from the axis and frictionally engaging the overlapping portion of the wear sleeve.

5. The row unit gear box seal system of claim 2 and further comprising:
a bias member disposed about the annular oil lip and biasing the annular oil lip of the resilient seal member radially inwardly.

6. The row unit gear box seal system of claim 1 wherein the resilient seal member is molded onto the portion of the annular attachment sleeve.

7. The row unit gear box seal system of claim 1 wherein the annular attachment sleeve is made of stainless steel and wherein the resilient seal member is made of rubber.

8. A corn head row unit gear box, comprising:
a structural frame having a first annular boss;
an input shaft rotatably mounted to the structural frame;
a set of output shafts rotatably mounted to the structural frame by a set of mounting mechanisms and each rotatable about a corresponding axis of rotation;
a gear train mounted within the structural frame that transfers rotation of the input shaft into rotation of the set of output shafts; and
a first seal system disposed about at least a given one of the mounting mechanisms that mounts at least a given one of the output shafts to the structural frame within the first annular boss, the first seal system comprising:
a first annular attachment sleeve with an inner surface in press fit engagement with an outer surface of the first annular boss;
a first resilient seal member, that is resilient relative to the first annular attachment sleeve, fixedly coupled to a portion of the first annular attachment sleeve, wherein the first resilient seal member directly, and frictionally, engages the given output shaft; and
a first wear sleeve that has a collar fixedly attached to the given output shaft along a contact portion that extends axially away from the first resilient seal member, the first wear sleeve having an overlapping portion that overlaps at least a portion of the first resilient seal member in an axial direction, the overlapping portion being spaced from the given output shaft in a radial direction, the first resilient member including a first annular lip that extends radially outward from the given output shaft and frictionally engages the overlapping portion of the first wear sleeve, the first wear sleeve being rotatably mounted relative to the first resilient seal member, to rotate with the given output shaft.

9. The corn head row unit gear box of claim 8 wherein the set of output shafts comprises a first gathering chain drive shaft and a second gathering chain drive shaft and wherein the given output shaft comprises the first gathering chain drive shaft.

10. The corn head row unit gear box of claim 9 wherein the structural frame includes a second annular boss and further comprising:
a second seal system disposed about at least a given one of the mounting mechanisms that mounts the second gathering chain drive shaft to the structural frame within the second annular boss.

11. The corn head row unit gear box of claim 10 wherein the second seal system comprises:
a second annular attachment sleeve with an inner surface in press fit engagement with an outer surface of the second annular boss;
a second resilient seal member, that is resilient relative to the second annular attachment sleeve, fixedly coupled to a portion of the second annular attachment sleeve and frictionally engaging the second gathering chain drive shaft; and
a second wear sleeve that has an overlapping portion that overlaps at least a portion of the second resilient seal member in the axial direction, the second wear sleeve directly, and frictionally, engaging the second resilient seal member, and being rotatably mounted relative to the second resilient seal member, to rotate with the second gathering chain drive shaft.

12. The corn head row unit gear box of claim 9 wherein the first gathering chain drive shaft rotates within a first bushing mounted to the structural frame and wherein the first resilient seal member comprises:
an annular oil lip extending radially inward toward an axis and frictionally engaging the first gathering chain drive shaft;
an annular dirt lip axially spaced from the annular oil lip in a direction away from the first bushing, the annular dirt lip extending radially inward toward the axis and frictionally engaging the first gathering chain drive shaft; and an annular excluder lip that frictionally engages a first portion of the first wear sleeve, the first portion of the first wear sleeve being different from the overlapping portion of the first wear sleeve, the first portion of the first wear sleeve deflecting the annular excluder lip in a direction generally radially away from the axis.

13. The corn head row unit gear box of claim 11 wherein the second gathering chain drive shaft rotates within a second bushing mounted to the structural frame and wherein the second resilient seal member comprises:

an annular oil lip extending radially inward toward an axis and frictionally engaging the second gathering chain drive shaft;

an annular dirt lip axially spaced from the annular oil lip in a direction away from the second bushing, the annular dirt lip extending radially inward toward the axis and frictionally engaging the second gathering chain drive shaft; and an annular excluder lip that frictionally engages a first portion of the second wear sleeve, the first portion of the second wear sleeve being different from the overlapping portion of the second wear sleeve, the first portion of the second wear sleeve deflecting the annular excluder lip in a direction generally radially away from the axis.

14. The corn head row unit gear box of claim 13 wherein the second resilient seal member comprises:

a first annular lip extending radially outward away from the axis and frictionally engaging the overlapping portion of the second wear sleeve.

15. A row unit gear box seal system, comprising:

an attachment member that attaches to a structural frame of a row unit gear box that includes a gathering chain drive shaft rotatably mounted to the structural frame by a bushing;

a wear sleeve attached to the gathering chain drive shaft for rotation with the gathering chain drive shaft;

a resilient seal member, that is resilient relative to the attachment member and that is fixedly coupled to the attachment member and directly engages the gathering chain drive shaft, the resilient member comprising:

an annular oil lip extending radially inward toward an axis of rotation of the gathering chain drive shaft, and sized for frictional engagement with the gathering chain drive shaft;

an annular dirt lip axially spaced from the annular oil lip in a direction away from the bushing, the annular dirt lip extending radially inward toward the axis of rotation and sized for frictional engagement with the gathering chain drive shaft;

an annular excluder lip that includes a connection portion and a tip portion disposed, in a relaxed position, radially spaced from the axis further than the connection portion, the tip portion frictionally engaging a first portion of the wear sleeve that is different front an overlapping portion of the wear sleeve, the first portion of the wear sleeve deflecting the tip portion of the annular excluder lip in a direction generally radially away from the axis when the wear sleeve is fitted over the resilient seal member; and a first annular lip extending radially outward away from the axis of rotation and frictionally engaging the overlapping portion of the wear sleeve.

16. The row unit gear box seal system of claim 15 wherein the attachment member comprises:

an annular attachment sleeve annularly disposed about the axis of rotation of the gathering chain drive shaft and having an inner surface, the inner surface of the annular attachment sleeve having an inner diameter sized for press fit engagement with an outer surface of a boss on the structural frame.

* * * * *